Dec. 7, 1965 H. G. KNUTH 3,221,894
ADJUSTABLE STORAGE RACK
Filed July 2, 1963 7 Sheets-Sheet 2

INVENTOR.
Harvey G. Knuth
BY
Prangley, Baird, Clayton, Miller & Vogel
Attys.

Dec. 7, 1965  H. G. KNUTH  3,221,894
ADJUSTABLE STORAGE RACK
Filed July 2, 1963  7 Sheets-Sheet 3

FIG. 5

INVENTOR.
Harvey G. Knuth
BY
Prangley, Baird, Clayton, Miller & Vogel
Attys.

Dec. 7, 1965  H. G. KNUTH  3,221,894
ADJUSTABLE STORAGE RACK
Filed July 2, 1963  7 Sheets-Sheet 4

INVENTOR.
Harvey G. Knuth
BY
Prangley, Baird, Clayton, Miller & Vogel
Attys.

FIG. 11

United States Patent Office 3,221,894
Patented Dec. 7, 1965

3,221,894
ADJUSTABLE STORAGE RACK
Harvey G. Knuth, Elgin, Ill., assignor to Lyon Metal Products, Incorporated, Aurora, Ill., a corporation of Illinois
Filed July 2, 1963, Ser. No. 292,264
39 Claims. (Cl. 211—134)

This invention relates to a storage rack which is adjustable horizontally. More particularly, it relates to an adjustable rack which is adapted to receive shelves of varying areas and in varying positions and numbers.

Many commercial establishments are regularly confronted with the problem of storing articles and packages in a wide variety of sizes under conditions where stocks are constantly changing. These constant changes demand readjustment of storage spaces both vertically as well as horizontally to provide efficiency and convenient storage, and such readjustment often must be accomplished without the use of any tools.

It is an object of this invention to meet this need by providing a storage rack in which the spaces are adjustable both vertically and horizontaly without requiring the use of any tools.

A further object of this invention is to provide such an adjustable rack with intermediate supports which may be removably interfitted with top and bottom cross rails at a variety of different locations to transmit the weight of the top and intermediate shelves to the bottom rail.

Still another object of the invention is to provide such an adjustable storage rack which is adapted to support shelves on metal angle clips which may be engaged in any of a series of square holes provided in end and intermediate upright members.

A still further object of the invention is to provide such an adjustable storage rack with metal angle clips which have an upstanding sharp prong formed thereon which will embed itself into a wood shelf to hold the shelf in place.

A still further object of the invention is to provide such an adjustable storage rack which can be assembled in any of a plurality of depths using the same parts.

A still further object of the invention is to provide such an adjustable storage rack in which each of the parts is adapted to serve in a plurality of positions, thereby minimizing the number of different parts required to constitute a complete rack.

Other objects will appear hereinafter.

In order that the invention may be better understood reference is made to the accompanying drawings which form a part of this specification and in which.

Figure 1:
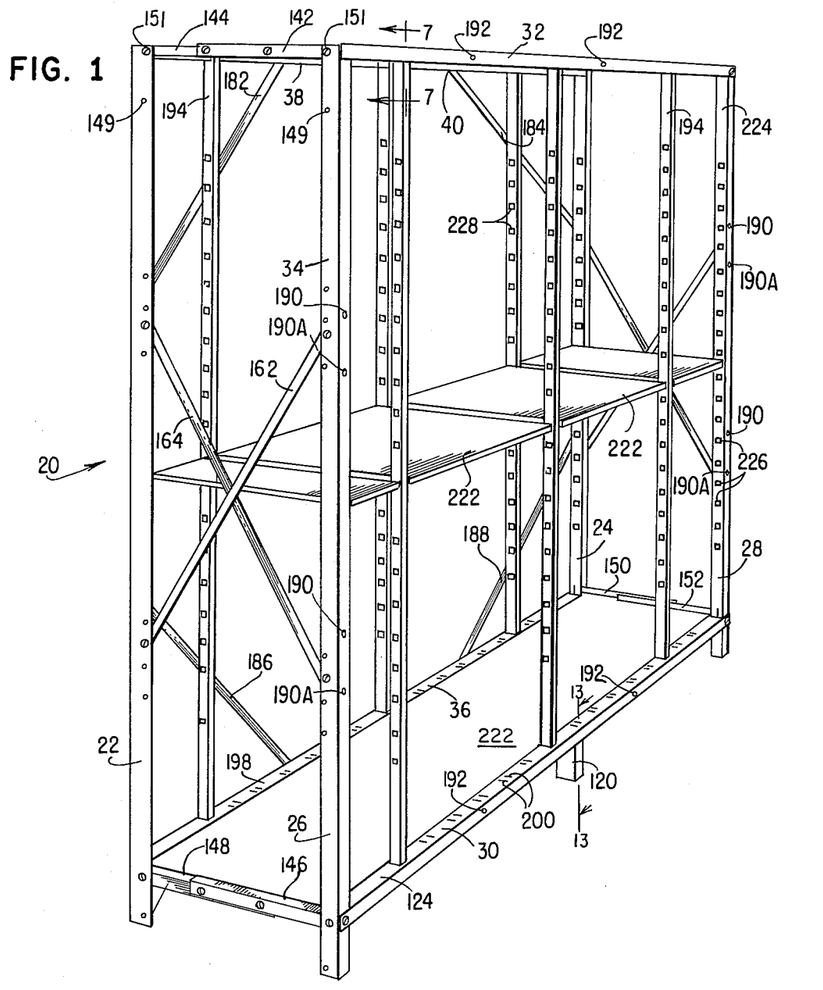
FIGURE 1 is a view in perspective showing a storage rack embodying the features of the present invention assembled at an intermediate depth.

Referring first to FIGURE 1, it will be seen that the adjustable rack there shown designated generally 20 comprises four end uprights 22, 24, 26, and 28. The lower portions of the uprights 26 and 28 are secured to the opposite ends of a lower cross rail 30 and in like manner the upper ends of the uprights 26 and 28 are secured to the opposite ends of an upper cross rail 32. As may be seen, the uprights 26 and 28 when so connected provide a front frame designated generally 34. The uprights 22 and 24 are similarly connected to a bottom cross rail 36 and a top cross rail 38 to provide a rear or back frame 40.

In the embodiment shown all of the uprights 22, 24, 26, and 28 are identical in construction so that they are interchangeable one with another, it being noted, however, that, for example, to interchange the uprights 22 and 26, each of them must be inverted. From this it follows that the upper and lower halves of these uprights must be and are symmetrical with each other and that in whatever way they are assembled, some openings provided therein are not used as will appear.

Figure 5:
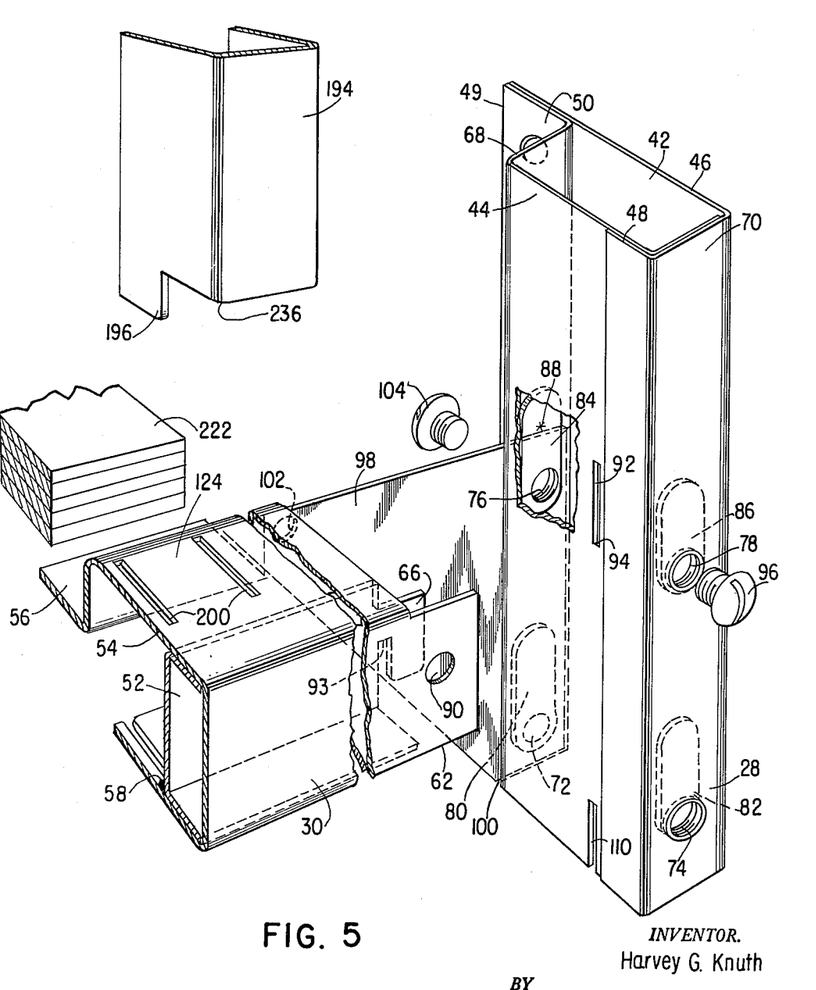
FIGURE 5 is an exploded view partly in cross section showing details of the cross rail and of the end and intermediate uprights and illustrating their assembly in forming the lower portion of the rack.
Figures 6, 7:
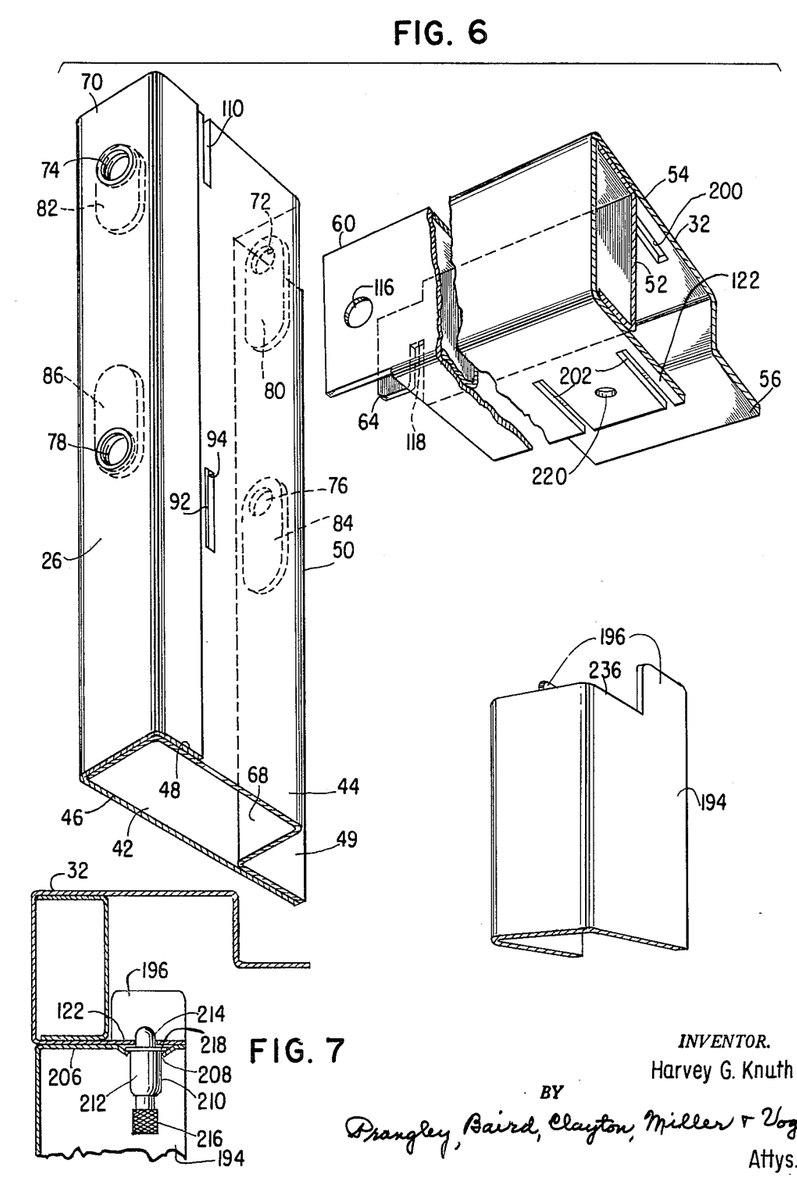
FIGURE 6 is a view similar to FIGURE 5 showing the same parts and illustrating their assembly in forming the upper portion of the rack.
FIGURE 7 is a view in cross section on the line 7—7 in FIGURE 1 through a top cross rail and the upper end of an intermediate upright.

As best seen in FIGURES 5 and 6, the uprights 22, 24, 26, and 28 are each formed of a pair of elongated vertically extending sheet metal members 42 and 44. The member 42, as shown, is generally J-shaped in horizontal cross section and the member 44 in cross section takes the form of a channel with a flange extending laterally from one arm of the channel. The members 42 and 44 are so proportioned that when assembled, as shown, the member 44 just fits into the space between the two arms 46 and 48 of the member 42 with the edge of the flange 49 thereof substantially flush with the edge of the long arm 46 of member 42. The members 42 and 44 are suitably secured together after assembly, for example, by spot-welding the flange 49 on the member 44 to the adjacent portion of the arm 46 on the member 42 at various places throughout their length. The flange 49 and the portion of the arm 46 to which it is secured thus form a thickened web 50 which serves purposes to be hereinafter described.

Referring next to the cross rails 30, 32, 36, and 38, it is pointed out that these likewise in the structure shown are identical with each other and thus are interchangeable. Like the uprights, these cross rails are formed of two elongated sheet metal members 52 and 54. As may be seen, the member 54 comprises a portion which is generally channel shaped in cross section but which is provided with an extension on one arm of the channel which projects outwardly beyond the edge of the other arm and is then bent inwardly toward the other arm and then outwardly to provide a shelf-supporting flange 56 as will be further pointed out. The members 52 and 54 are so proportioned that the channel shaped member 52 just fits within the channel portion of the member 54 when inserted in opposed relation, as shown. When the member 52 has been seated within the channel shaped portion of the member 54, these members are suitably secured together, for example, by weldments 58 between the outer corners of the channel shaped member 52 and the adjacent inner surfaces of the channel shaped portion of member 54 at various points spaced apart lengthwise of these members. Each cross rail is provided on its opposite ends with extensions 60 and 62 which form a part of the member 54, and each cross rail is likewise formed on its opposite ends with tangs 64 and 66 which project outwardly parallel to the extensions 60 and 62 and form a part of the member 52.

Referring now to FIGURE 5 which shows portions of the end upright 28 and the bottom rail 30, it will be observed that the end upright 28 a short distance from its lower end is provided centrally in its opposed narrow walls 68 and 70 with openings 72 and 74. Spaced upwardly approximately equal distances from these openings are another pair of openings 76 and 78. To receive and secure bolts extending in these openings, weld nuts 80, 82, 84, and 86 are secured to the inner faces of walls 68 and 70 with their threaded openings in registration, respectively, with the openings 72, 74, 76, and 78 which, of course, are of a size suitable to receive a bolt of the size for which the weld nut is designed. The weld nuts are preferably secured in place by spot-welding and to the adjacent wall as indicated at 88 in respect to the nut 84 which is shown in full by breaking away a portion of the wall of the upright 28.

The tangs such as the tang 66 are designed to extend into the interiors of the uprights such as the end upright 28 when the cross rail 30 and the upright 28 are brought into assembled relation with the opening 90 in the projection 62 in registration with the opening 78 in the upright 28. To this end a slot 92 having its lower end 94 in alignment horizontally with the center of opening 78 is formed in the inwardly facing broad wall of the upright 28 as shown. In the assembly, then the cross rail 30 is lifted upwardly until the tang 66 is able to pass through the slot 92 and then dropped or pushed downwardly until the lower face 93 of the portion of the tang 66 which connects to the body of the cross rail 30 engages the lower face 94 of the slot 92 which then brings the projection 62 into proper position adjacent the outer face of wall 70 with the opening 90 in registration with the opening 78 since the surface 93 on tang 66 is in alignment horizontally with the center of opening 90. A bolt 96 is then inserted in the openings 90 and 78 and then threaded into the weld nut 86, thereby firmly securing the cross rail 30 to the upright 28. As indicated in FIGURE 6, the end of each cross rail opposite to that shown in FIGURE 5 has the same construction as shown and described in connection with FIGURE 5 and is assembled to the associated end upright in the same way as has just been described, making it unnecessary to repeat the description in connection with each of the connections.

Figures 10, 11, 12, 13:
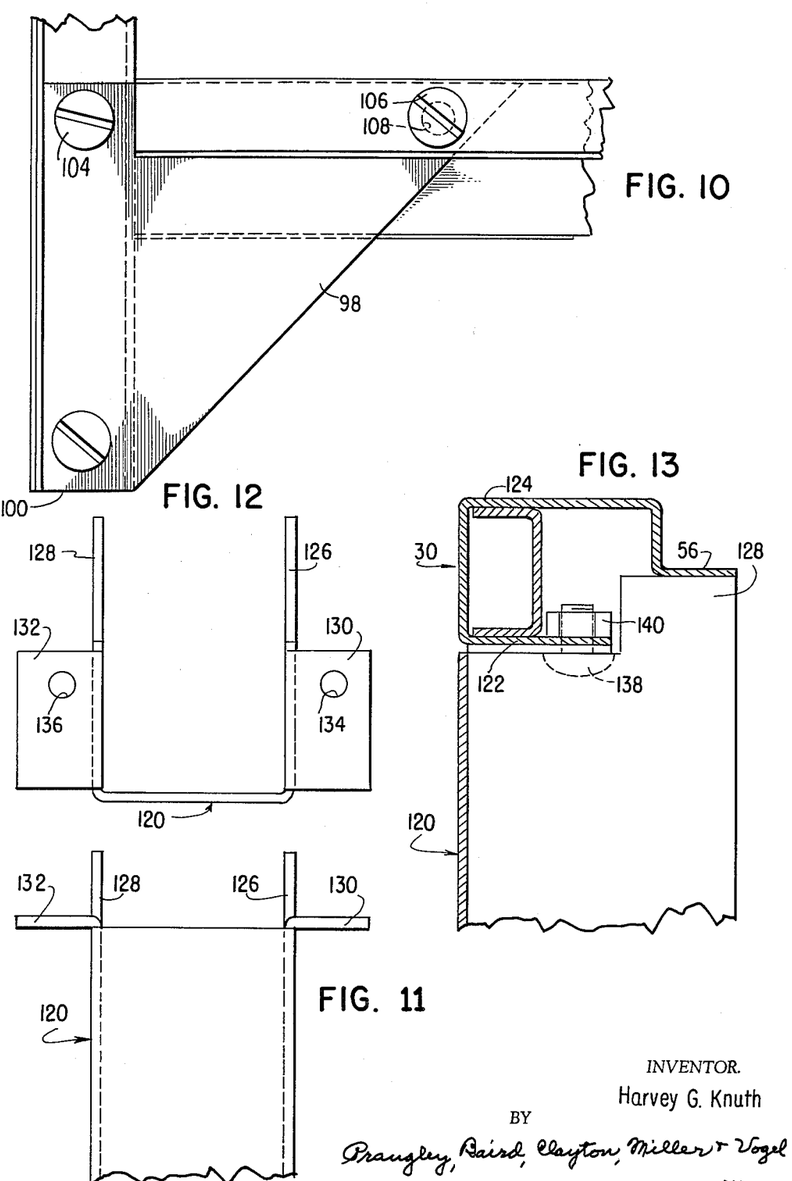
FIGURE 10 is an enlarged inside elevational view showing a gusset which is mounted between the end of each lower cross rail and the bottom of the end upright upon which it is supported.
FIGURE 11 is an elevational view of the outer face of the foot which supports each lower cross rail intermediate of its length.
FIGURE 12 is a top plan view of the foot shown in FIGURE 11.
FIGURE 13 is a view in cross section on the line 13—13 in FIGURE 1.

For the purpose of further strengthening the connections between the lower cross rails 30 and 36 and the four end uprights, four gusset plates, such as gusset 98 shown in FIGURES 5 and 10, are provided, one for each of the four joints between a bottom rail and an upright. As may be seen from the gusset plate 98, these plates take the form of right triangles with one of the acute angle corners cut off as shown at 100 to provide a bottom edge which aligns with the bottom of the end upright. The gusset plate 98 is provided with three openings such as 102 to receive fasteners for securing it to the upright and the cross rail. As indicated in FIGURE 5, for fastening to the upright 28 the plate 98 is positioned against the outer face of the wall 68 with the opening adjacent the right angle corner in registration with the opening 76 and with the opening adjacent the lower edge in registration with the opening 72, the openings 76 and 72 having been positioned so as to make this possible. Bolts such as the bolt 104 are then inserted through the opening in the gusset and threaded, respectively, into the weld nuts 80 and 84. The other corner of the gusset 98 as best seen in FIGURE 10 is secured to the cross rail 30 by a bolt 106 extending through the opening 102 and thence through an opening 108 suitably positioned in the depending wall of cross rail 30 which carries the shelf supporting flange 56 and receiving a nut, not shown, which is drawn up tight against the outer face of the said depending wall of cross rail 30.

Attention is next directed to FIGURE 6 which illustrates portions of end upright 26 and top cross rail 32. The top cross rails 32 and 38 are secured to the end uprights with their top surfaces approximately in alignment with the tops of the end uprights and to this end, an open ended slot 110 is provided, as shown at the top of the upright 26, to receive the tang 64. The lower end of the slot 110 is substantially in alignment with the center of the opening 74 previously described which has weld nut 82 associated therewith. The extension 60 on top cross rail 32 is provided with an opening 116 therethrough which corresponds with the opening 90 in the extension 62. This opening is also positioned so that its center is in alignment horizontally with the lower edge 118 of that part of tang 64 which is connected to the body of the cross rail 32. As a result, when the tang 64 is passed through the slot 110 and dropped or pushed downwardly until the surface 118 is engaged with the bottom of the slot 110, the extension 60 is brought into position adjacent the outer face of wall 70 with the opening 116 in registration with the opening 74. A bolt, not shown, is then inserted through openings 116 and 74 and threaded into the weld nut 82 to secure the top cross rail 32 to the upright 26. Again, only one connection between a top cross rail and an end upright is shown since all of the other three are the same as that shown and described.

The lower cross rail 30 is supported centrally by a foot 120 as shown in FIGURE 1 and an identical foot, not shown, provides central support for the lower cross rail 36, forming a part of the rear or back frame 40. The details of the structure of these feet are shown in FIGURES 11, 12, and 13. As appears in FIGURE 12, the foot 120 is formed of sheet metal which is generally U or channel shaped in horizontal cross section and is positioned with the open end of the U or channel facing inwardly, the same also being true for the foot not shown.

Digressing for a moment, it is pointed out that, as best seen in FIGURE 13, the lowermost wall 122 of the cross rail 30 extends inwardly from the front face of the cross rail a distance of only a little more half the overall depth of the cross rail measured from the outer face to the inner edge of the shelf supporting flange 56, which latter, in turn, is located vertically about halfway between the lower wall 122 and the upper wall 124 of the cross rail. Because of this construction and in order to provide complete support for the cross rail, the inner portions 126 and 128 of the side walls of the foot 120 are provided with a height equal to the vertical distance between the lower face of the flange 56 on the lower cross rail 30 and the plane of the bottom edges of the end uprights 22, 24, 26, and 28. To provide means for securing foot 120 to the cross rail as well as to support the lower wall 122 thereof, the outer portions of walls 126 and 128 to a distance inwardly from the front face of the foot 120 equal to the distance from the front face of rail 30 to the inner edge of wall 122 thereof are provided with laterally extending flanges 130 and 132, the upper surfaces of which are spaced from the bottom of the foot by an amount equal to the vertical distance between the bottom surface of wall 122 and the plane of the bottom edges of the end uprights 22, 24, 26, and 28.

In this way, when the foot 120 is positioned under the rail 30 as shown in FIGURE 13, the rear wall portions 126 and 128 support the flange 56 and the wall 122 of rail 30 rests on and is firmly supported by the flanges 130 and 132. The flanges 130 and 132 are provided, respectively, with openings 134 and 136 extending therethrough and located so as to register with openings provided in the wall 122 of rail 30 approximately at equal distances on each side from the midpoint lengthwise of the rail 30 and approximately midway laterally of the inner half of the wall 122. As indicated in FIGURE 13 bolts 138 are inserted upwardly through each pair of aligned openings and a nut 140 is threaded thereon and pulled down tightly against the wall 122 to secure the foot in place.

The feature of depth adjustability in the storage rack 20 is provided by applicant's novel means for securing the above described front frame 34 to the rear frame 40. This novel means comprises a combination of horizontal and oblique braces or connections which are removably connected to and between the frames in a plurality of different positions, each of which provides a different spacing between the frames. This structure is shown in FIGURES 1 to 4. Thus, as shown in FIGURE 1, the tops of the frames 34 and 40 are tied together at each end of the rack by two lengths of sheet metal angles, the pair connecting uprights 22 and 26 being designated 142 and 144 and the other pair not being shown since they are identical with the pair 142 and 144. Like pairs of metal angle stock also join the lower portions of the frames together at each end, these being designated 146, 148, 150, and 152.

The thickened web 50 previously described which is provided on each of the end uprights 22, 24, 26, and 28 provides a convenient place to which to connect the metal angle members, and for this purpose web 50 on each upright as shown in FIGURES 1 to 4 is perforated adjacent each end as at 147 and also at points spaced from each end as at 149. The angle members such as 142 and 144 are also provided with pairs of perforations adjacent each end. Through the perforations 147 and 149 just described, one end of an angle member such as 142 and 144 can be secured to the web of an upright both adjacent to the top and adjacent the bottom cross rails by means of bolts such as the bolts 151 and cooperating nuts, not shown.

Figure 2:
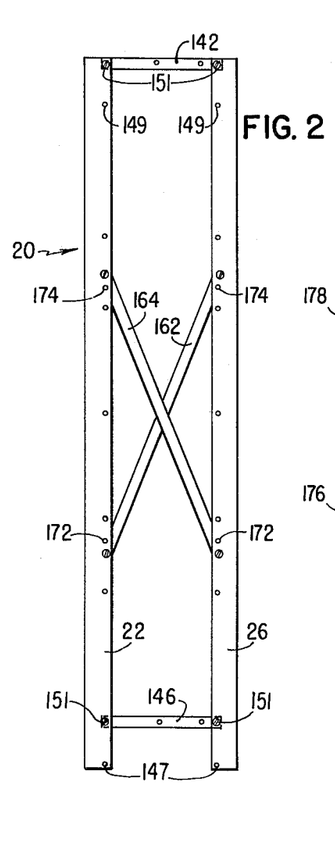
FIGURE 2 is an elevational view of one end of the rack shown in FIGURE 1 assembled at minimum depth.

FIGURE 2 shows the rack 20 adjusted to its smallest depth. As may be seen in this position, only one angle member is used for each connection, these being angle member 142 at the top and angle member 146 at the bottom. Angle member 142 is secured to the upright 22 at one end by a bolt 151 extending through the opening 147 in the upper end of the upright and then through an opening in one end of the angle member and receiving a cooperating nut and is secured at the other end to the upright 26 by another bolt 151 extending through the opening 147 at the upper end of that upright and thence through the angle member to receive a cooperating nut. The angle member 146 is similarly secured to each upright by bolts 151 extending through openings 149 adjacent to the lower ends thereof. The uprights 24 and 26 at the opposite ends of frames 34 and 40 are secured together in the same way.

Figure 3:
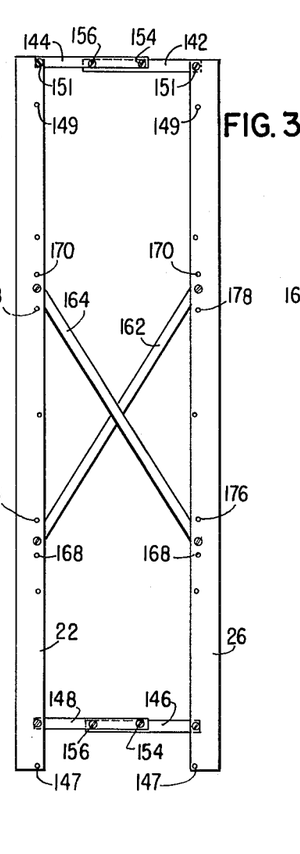
FIGURE 3 is a view similar to FIGURE 2 but showing the rack at the same intermediate depth as shown in FIGURE 1.

The particular rack shown is designed to be adjusted to three different depths and the second or intermediate depth is illustrated in FIGURE 3 of the drawings. In the assembly pairs of angle members, such as 142 and 144, are employed for each connection between the frames. One end of each of the angle members is secured to an upright and the angle members overlap for approximately half their length. Thus, one end of angle member 142 is secured to upright 26 by a bolt extending through the opening 147 in the upper end of the upright and then through the angle member to receive a cooperating nut. In like manner, one end of angle member 144 is secured to the opposed upright 22. Through an opening or perforation adjacent the midportion of each angle member positioned to register with an opening adjacent the end of the other angle member in the pair of angle members 142 and 144 in the assembly shown in FIGURE 3, bolts such as 154 and 156 may be inserted and secured by nuts, not shown, to secure the angle members together in a rigid connection. In like manner the pair of angle members 146 and 148 are secured to the lower ends of uprights 22 and 26 by means of the openings 149 formed therein and other pairs of angle members corresponding, respectively, to 142–144 and 146–148 are secured in like manner to uprights 24 and 28 at the other ends of frames 34 and 40.

Figure 4:
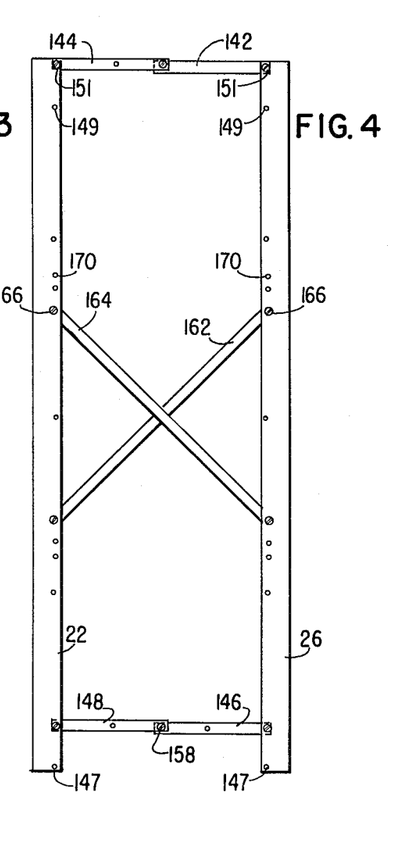
FIGURE 4 is another view similar to FIGURE 2 but showing the rack assembled at maximum depth.

As may be seen in FIGURE 4, which shows the rack at its greatest depth, one end of each of the angle members 142, 144, etc. is secured to each upright as in the assembly shown in FIGURE 3 and the angle members in each of the four pairs are overlapped just sufficiently to bring the openings adjacent the ends thereof remote from the upright into registry so that they may be secured by bolts such as 158 and cooperating nuts, not shown.

The angle members such as 142, 144, etc. are preferably made identical as shown so that they are fully interchangeable. This is not essential, however, and it will be apparent that by varying the length and the number and positioning of the holes in the angle members it is possible to provide adjustable racks which may be set at any desired depths or combinations of depths.

While the angle iron ties just described serve to fix the spacing of the uprights, they alone are not effective to rigidify the rack and prevent it from collapsing. In order to brace the rack against collapsing, a pair of elongated metal bars or braces 162 and 164 is provided for each end of the rack which, like the angle iron ties, are secured to the webs 50 of the end uprights by means of bolts, such as bolt 166, inserted through openings in the webs and in the ends of the braces 162 and 164 and secured by nuts, not shown. To permit the desired depth adjustment a plurality of sets of openings in the webs 50 of the uprights are provided, there being three such sets in the embodiment shown. The openings in the various sets are preferably located above and below the horizontal center line of each end upright and at equal distances therefrom.

In assembling the rack at the minimum depth as may be seen in FIGURE 2, the set of openings 168 and 170 most remote from the center line is used. The set of openings 172 and 174 provide for the intermediate depth adjustment as shown in FIGURE 3 and the openings 176 and 178 which are closest to the center line provide for the maximum depth position of the rack shown in FIGURE 4.

Figure 14:
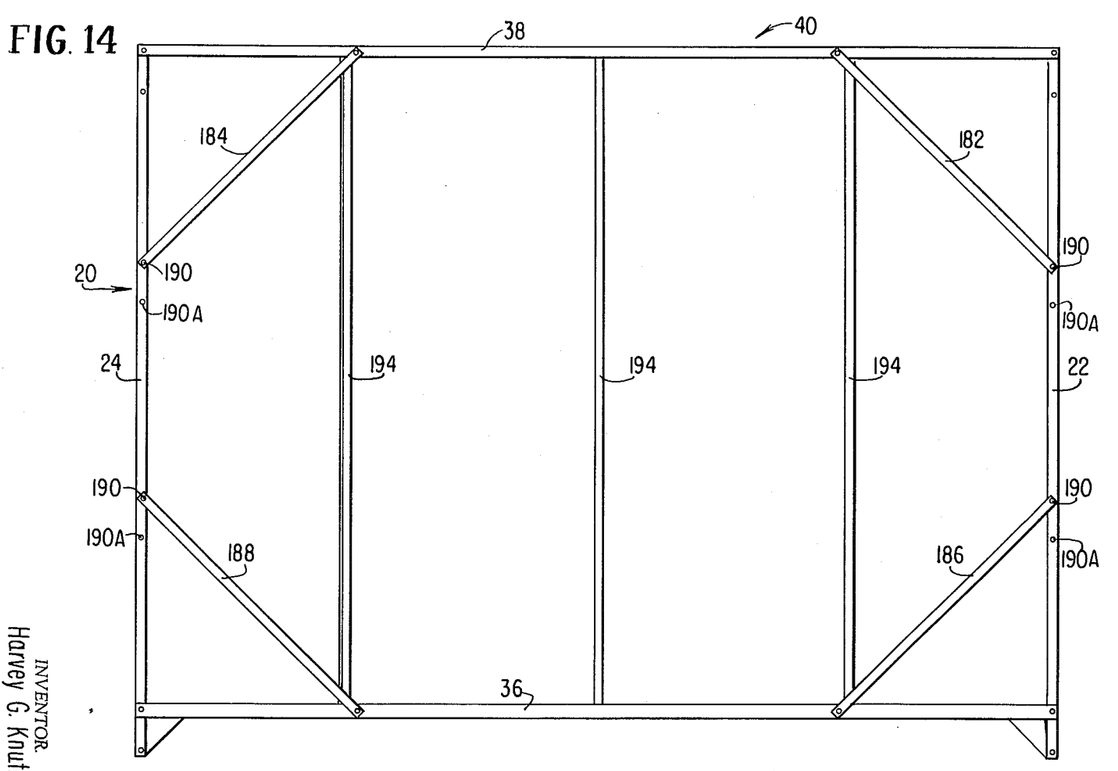
FIGURE 14 is an elevational view of the back of the rack shown in FIGURE 1.

It is preferable to provide the back frame 40 with corner braces to provide the rack 20 with lateral rigidity. The strips or braces 182, 184, 186, and 188 shown in FIGURE 1 serve this purpose and preferably are made identical with braces 162 and 164 to minimize the number of different kinds of parts. For convenience in describing the methods by which these braces are attached, reference is made to the front frame 34 as well as to the back frame 40 since they are identical as previously pointed out. Thus, it will be noted that the end uprights 26 and 28 as shown in FIGURE 1 are each provided with a pair of openings 190 spaced approximately equal distances on either side of the mid-point between the position of the lower edge of cross rail 30 on each upright and the top edge of the upright. Correspondingly, the cross rails 30 and 32 are each provided with a pair of openings 192 which are respectively spaced inwardly from the ends of the cross rails a distance about equal to the distance between the upper opening 190 and the upper end of the upright. Prior to the assembly of the uprights and the cross rails, weld nuts, such as the weld nut 84 shown in FIGURE 5, one for each of the openings 190 and 192, are secured to the inner faces of the walls in which the openings 190 and 192 are formed with the threaded opening in the weld nut in registration with the opening 190 or 192 with which it is associated. As shown in FIGURE 14, the braces 182, 184, etc. may thus be readily secured to the back frame 40 by bolts passed through the braces and threaded into these weld nuts.

Since the openings 190 are not located on opposite sides of mid-point vertically of the uprights at approximately equal distances therefrom, it is necessary to provide a second set of openings 190A in each upright to preserve the reversibility thereof, i.e., to permit either end of any upright to be uppermost. The openings 190A which are used in place of the openings 190 when, for example, the upright 26 is positioned in the rack in a reversed position, i.e., with the end closer to openings 190A uppermost, are spaced, respectively, the same distances from the latter end as the openings 190 are spaced from the upper end of upright 26 as it is shown in FIGURE 1. Openings 190A are also provided with weld nuts as described above in connection with openings 190.

Figures 8, 9:
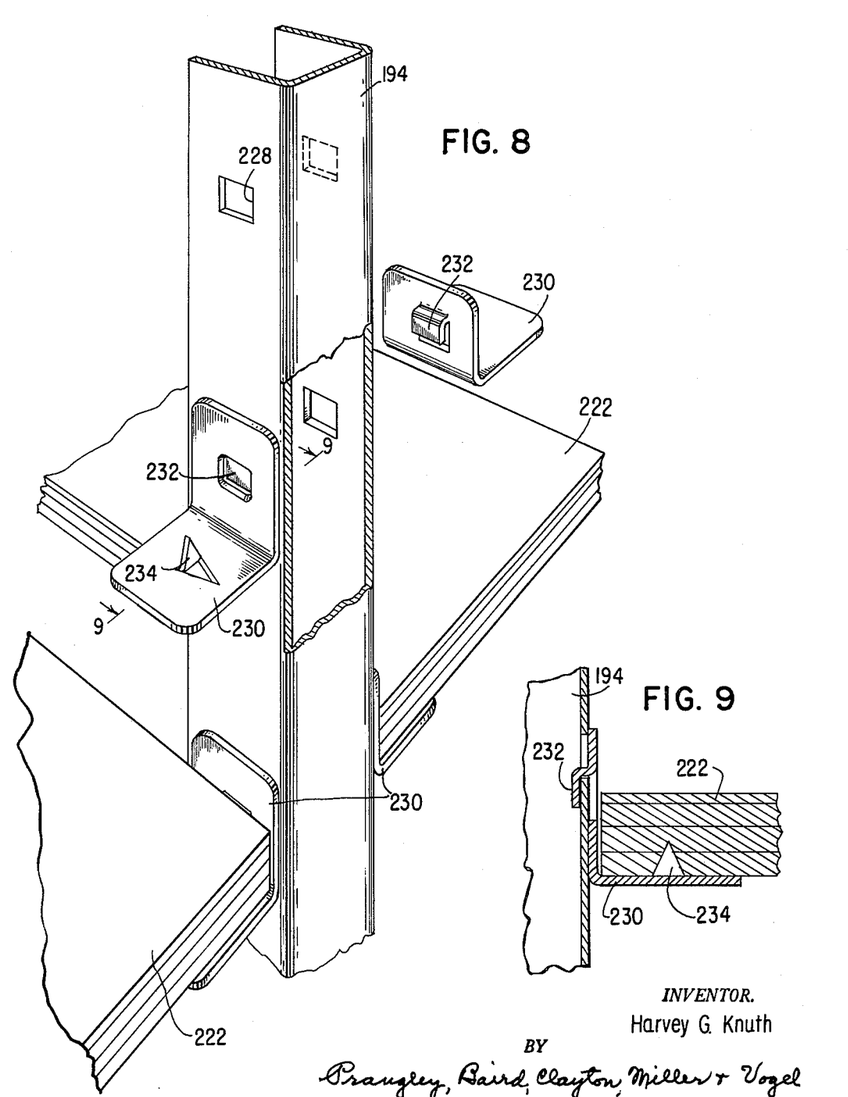
FIGURE 8 is an enlarged fragmentary view in perspective showing the mounting of the angle clips on an intermediate upright and the manner in which they support the shelves.
FIGURE 9 is a view in cross section on the line 9—9 in FIGURE 8.

The bottom cross rails 30 and 36 are designed to carry a portion of the weight load of the top and intermediate shelves and adjustable intermediate uprights 194 are provided to transmit this weight to the rails. Portions of these intermediate uprights are shown in FIGURES 5, 6, and 8 as well as in FIGURE 1. As may be seen, these intermediate uprights 194, all of which are identical, are generally U or channel shaped in cross section and are positioned with the open portion of the U facing inwardly. At each end the uprights 194 are provided with a pair of tangs 196 extending outwardly longitudinally of the upright adjacent to the open face of the U or channel.

As best seen in FIGURES 1 and 5, the cross rails are each provided on their upper faces 124 with a series of pairs of slots 200 to provide means for mounting the uprights 194 at any of a plurality of positions lengthwise of the cross rail. The slots 200 in each pair are spaced apart a distance the same as the distance between the tangs 196 on the ends of the upright 194. These slots 200 which are closed at both ends are made just long enough to receive the tangs 196 and are positioned close to the depending wall which carries the shelf supporting flange 56 in a position such that when the tangs 196 on the bottom of an upright 194 are in position in the slots, the front face of the upright 194 is set in slightly from the front face of the cross rail.

Referring now to FIGURE 6, it is pointed out that in alignment longitudinally of the cross rail with each pair of slots 200, another pair of similarly spaced but open ended slots 202 is provided in the bottom face 122 of the cross rail. Turning again to the intermediate uprights 194, it may be seen in FIGURE 7 that these uprights are formed with a top wall 206 located immediately below the bottom edges of each of the upper tangs 196. Approximately centrally between the tangs 196 and midway of their width the wall 206 is provided with a countersunk opening 208. Seated in this opening 208 is a plunger shelf catch 210. This shelf catch 210, which is a well known type, comprises a body portion 212, a retractable plunger 214 spring loaded within the body portion to bias it outwardly, and a finger gripping portion 216 which is used to retract the plunger 214. The annular flange 218 on the upper end of the body portion 212 seats in the countersunk portion surrounding the opening 208 to locate the plunger 214 properly.

Referring back again to FIGURE 6, it will be noted that the wall 122 of the cross rail between the slots 202 is provided with an opening 220 which serves to receive the plunger 214 and secure the intermediate upright in position with the top tangs 196 in the slots 202 and with the front face of the upright set in slightly from the front face of the upper cross rail. Thus, to locate the intermediate uprights at any desired position, the bottom tangs thereof are first seated in the appropriate pair of openings 200 and the upper end of the intermediate upright is pivoted from inside of the rack outwardly with the plunger 214 retracted to cause the upper tangs 196 to enter the slots 202 through their open ends and when the plunger 214 registers with the opening 220, the plunger, being released, will enter this opening and secure the intermediate upright in position. To thereafter remove the intermediate upright, it will be obvious that all that is required is to retract the plunger and push the upper end of the upright inwardly until the lower tangs 196 can be removed from the slots 200.

The rack 20 is designed to receive and support a plurality of wooden shelves such as the shelves 222 shown in FIGURES 1 and 8 in any of a plurality of vertically spaced positions. For this purpose each of the end uprights is provided on its inner broad face 224 with a series of square openings 226. Corresponding series of square openings 228 are also provided in each side face of each intermediate upright 194. To cooperate with these openings in supporting shelves, a plurality of metal angle clips 230 is provided. As shown in FIGURE 8, a square portion 232 is struck out centrally of one flange of each angle clip 230 on three sides, leaving the edge remote from the angle attached. As best seen in FIGURE 9, this struck-out portion is bent into spaced apart parallel relation to the arm of the clip to which it remains attached, the spacing of the portion 232 being sufficient to accommodate the material of which the uprights 194 are formed. Centrally of the other flange of the clip 230, a triangular portion 234 is struck out on two sides and bent inwardly to provide a sharp prong which will embed itself into a wood shelf to hold the shelf in place. The clips 230 which may be supported in any of the openings 226 or 228 are placed in shelf-supporting position by inserting the struck-out portion 232 into the opening 226 or 228 and dropping or pushing the clip downwardly until the portion 232 seats against the inner face of the upright below the opening.

Referring back again to the intermediate uprights 194, it will be noted that each end surface of the upright from which the tangs 196 extend provides a shoulder 236. When an upright 194 is positioned on the rack 20 as previously described, the shoulder 236 at the top engages the undersurface of one of the top cross rails 32 and 38 alongside of the pair of slots 202 in which the tangs 196 on the upper end of the upright extend and the shoulder 236 at the lower end of the upright engages the top surface of the underlying cross rail 30 or 36 alongside of the pair of slots 200 in which the tangs 196 at the lower end of the upright extend. Thus, the weight load of the top cross rail is transmitted to the upright 194 through the shoulder 236 at the top and that weight load plus the weight load of shelves between the top and bottom cross rails transmitted to the upright through the angle clips 230 is, in turn, transmitted to the bottom cross rail by the shoulder 236 at the bottom of the upright.

Racks embodying the features of the present invention may vary in a number of respects from the particular rack described above and shown in the drawings forming a part of this specification. While each of the features of this particular rack is preferred and advantageous, a number of them may be omitted in certain modifications of this invention as has been and will be pointed out subject, however, to loss of the advantages attendant upon them.

Thus, the structure of the end uprights may be altered in a number of respects within the scope of the invention and, for example, they need not all be identical and interchangeable. The same is also true of the cross rails and intermediate uprights as will be apparent. Variations in the means and methods employed to secure the parts of the rack together may also be made. The number of and positioning of the clip supporting openings and of the slots engaged by the uprights are matters of choice.

Many of the advantages of the present invention will be readily apparent from the foregoing description. An outstanding advantage is the feature of depth adjustability at the same time preserving strength and rigidity in the rack in each of the positions to which it is adjustable. The nature of the adjustable interconnection has the further advantage that it is such as to permit the preselection of whatever number of depth adjustments and settings the user may desire. In the improved rack, moreover, the depth adjustability is combined with vertical adjustability of the shelf supports.

The intermediate uprights by reason of the means by which they are mounted between the upper and lower cross rails may be readily positioned in whatever number may be desired at any of a series of locations between the end uprights and just as readily removed. This provides the further advantage that they can be used in whatever number may appear necessary to carry the varying shelf loads to which the rack may be subjected and removed or not used to any greater extent than necessary, thereby facilitating access to the shelves on the rack. The metal angle clips, in addition to contributing to the adjustability of the rack, have the additional advantage that the sharp prong on the supporting flange can be embedded in wood shelving to hold the shelf in place.

It is apparent that many widely different embodiments of this invention may be made without departing from the spirit and scope thereof and, therefore, this invention is not intended to be limited except as indicated in the appended claims.

I claim:

1. An adjustable rack comprising at least two spaced apart, generally rectangular, upright frames including end uprights, means for fastening said frames rigidly to each other in a generally parallel opposed relationship and adjustable means, positioned between the end uprights on at least one of said frames for transmitting the load of the top cross rail and of intermediate shelves to the bottom cross rail of said frame, comprising an intermediate upright extending vertically between the said cross rails and having a shoulder at each end, which shoulders, respectively, engage the opposed faces of said cross rails; and means for removably securing said upright in the said vertically extending position at a plurality of positions spaced at predetermined distances from the said end uprights which comprises tangs extending outwardly from the ends of the upright in a direction lengthwise thereof and slots in each of the cross rails at the said predetermined distances from the end uprights for receiving said tangs.

2. A rack as described in claim 1 in which the slots in one of said upper and lower cross rails are closed at both ends and in which the slots in the other of said cross rails are closed at one end only, permitting a tang to be inserted therein through the other open end, and in which there are cooperating means associated with said open ended slots and the end of the intermediate upright adjacent thereto removably to retain the tangs in the open ended slots.

3. A rack as described in claim 2 in which each intermediate upright has two of said tangs at each end, in which there are pairs of said slots in each of said cross rails at each of said predetermined distances from the end uprights, the slots in each pair being spaced apart a distance equal to the spacing between the two tangs on an end of an intermediate upright, in which the open ended slots are in the upper cross rail, in which there is an upwardly spring biased plunger on the intermediate upright extending upwardly between the tangs on the upper end thereof and retractable downwardly to a position below the lower edges of the tangs, and in which there is an opening between each pair of the open ended slots removably receiving said plunger to retain the tangs in the open ended slots.

4. An adjustable rack comprising at least two spaced apart, generally rectangular, upright frames including end uprights, means for fastening said frames rigidly to each other in a generally parallel opposed relationship with the frames adjustably spaced from each other a plurality of predetermined distances, and adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders, respectively, engage the opposed faces of said cross rails, and means for removably securing said upright in the said vertically extending position at a plurality of positions spaced at predetermined distances from the said end uprights which comprises tangs extending outwardly from the ends of the upright in a direction lengthwise thereof and slots in each of the cross rails at the said predetermined distances from the end uprights for receiving said tangs.

5. A rack as described in claim 4 in which the slots in one of said upper and lower cross rails are closed at both ends and in which the slots in the other of said cross rails are closed at one end only, permitting a tang to be inserted therein through the other open end, and in which there are cooperating means associated with said open ended slots and the end of the intermediate upright adjacent thereto removably to retain the tangs in the open ended slots.

6. A rack as described in claim 5 in which each intermediate upright has two of said tangs at each end, in which there are pairs of said slots in each of said cross rails at each of said predetermined distances from the end uprights, the slots in each pair being spaced apart a distance equal to the spacing between the two tangs on an end of an intermediate upright, in which the open ended slots are in the upper cross rail, in which there is an upwardly spring biased plunger on the intermediate upright extending upwardly between the tangs on the upper end thereof and retractable downwardly to a position below the lower edges of the tangs, and in which there is an opening between each pair of the open ended slots removably receiving said plunger to retain the tangs in the open ended slots.

7. An adjustable rack comprising at least two spaced apart, generally rectangular, upright frames including end uprights, means for fastening said frames rigidly to each other in a generally parallel opposed relationship with the frames adjustably spaced from each other a plurality of predetermined distances, adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders, respectively, engage the opposed faces of said cross rails, means for removably securing said upright in the said vertically extending position at a plurality of positions spaced at predetermined distances from the said end uprights, and means adjustable on said uprights for supporting shelves on said rack at any of a plurality of predetermined levels.

8. A rack as described in claim 7 in which each of the opposing faces of the two end uprights on at least one of said frames has formed therein a plurality of shelf clip supporting openings positioned in the same predetermined vertically spaced relation to the lower cross rail on each of said end uprights, in which each of said intermediate uprights each have two faces opposed, respectively, to the last named opposing faces on the end uprights, in which the last named two faces of the intermediate uprights each has formed therein shelf clip supporting openings in the same number as and positioned in the same predetermined vertically spaced relation to the lower cross rail as the said last named openings in the end uprights, and in which the said adjustable means for supporting shelves comprises a plurality of clips, each having two flanges extending at right angles to each other, one of said flanges serving to underlie and furnish support to a shelf and the other having means thereon engageable in any of said clip supporting openings to support the clip on the upright in which the opening is contained.

9. A rack as described in claim 8 in which shelf supporting flanges of the clips each have extending upwardly thereon a sharp prong which will embed itself into a wood shelf to hold the shelf in place.

10. A rack as described in claim 8 in which the clip supporting openings are generally rectangular in configuration and are positioned so that two edges of each opening extend generally horizontally and in which the means on the clip engageable in said openings comprises a generally rectangular tongue integral with the vertical flange of the clip and extending outwardly from the clip and downwardly in spaced generally parallel relation to said vertical flange.

11. A rack as described in claim 10 in which the said tongue on the clip has a horizontal width approximating but less than the horizontal width of the clip supporting openings and in which the downwardly extending portion of said tongue is spaced from the body of the tongue a distance approximating but greater than the thickness of the material of which said uprights are formed.

12. A rack as described in claim 10 in which the shelf supporting flanges of the clips each have extending upwardly thereon a sharp prong which will embed itself into a wood shelf to hold the shelf in place and in which the said prong and the said tongue are each formed of material struck out of the body of the clip on all sides but one end bent to the configurations described.

13. An adjustable storage rack comprising at least two spaced apart, generally rectangular, upright frames including end uprights and means for fastening said frames rigidly to each other in a generally parallel opposed relationship with the frames adjustably spaced from each other a plurality of predetermined distances comprising horizontal and oblique braces at each end of the frames and means for removably connecting each of said braces at each end of said frames to each of the uprights at that end of each of said frames in each of a plurality of predetermined relationships.

14. A rack as described in claim 13 in which one of said frames is rigidified by oblique braces at each corner thereof connected to and extending between the uprights and the horizontal cross members of the frame.

15. A rack as described in claim 13 in which there are two of said horizontal braces and two of said oblique braces at each end of the frames and in which, at each end of the frames, the upper end of one of the oblique braces is connected to one of the uprights at that end and the upper end of the other oblique brace is connected to the other upright at that end.

16. A rack as described in claim 15 in which the horizontal braces are located, respectively, adjacent to the tops and bottoms of the frames and the oblique braces are positioned in overlapping relation on approximately the mid-portion of the uprights in a vertical direction.

17. A rack as described in claim 16 in which the means for connecting the oblique braces in a plurality of relationships comprises at least two vertically spaced fastener openings in each upright for each of the two oblique braces connected thereto and in which the horizontal braces are comprised of two separable overlapping parts and are provided with means for removably connecting said parts to each other in a plurality of relationships.

18. An adjustable rack comprising at least two spaced apart, generally rectangular, upright frames including end uprights, means for fastening said frames rigidly to each other in a generally parallel opposed relationship and adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders, respectively, engage the opposed faces of said cross rails; and means for removably securing said upright in the said vertically extending position at a plurality of positions spaced at predetermined distances from the said end uprights.

19. An adjustable rack comprising at least two spaced apart, generally rectangular, upright frames including end uprights, means for fastening said frames rigidly to each other in a generally parallel opposed relationship with the frames adjustably spaced from each other a plurality of predetermined distances, and adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders, respectively, engage the opposed faces of said cross rails, and means for removably securing said upright in the said vertically extending position at a plurality of positions spaced at predetermined distances from the said end uprights.

20. An adjustable rack comprising at least two spaced apart, generaly rectangular, upright frames including end uprights, means for fastening said frames rigidly to each other in a generally parallel opposed relationship, adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders, respectively, engage the opposed faces of said cross rails, means for removably securing said upright in the said vertically extending position at a plurality of positions spaced at predetermined distances from the said end uprights, and means adjustable on said uprights for supporting shelves on said rack at any of a plurality of predetermined levels.

21. A rack as described in claim 20 in which each of the opposing faces of the two end uprights on at least one of said frames has formed therein a plurality of shelf clip supporting openings positioned in the same predetermined vertically spaced relation to the lower cross rail on each of said end uprights, in which each of said intermediate uprights each have two faces opposed, respectively, to the last named opposing faces on the end uprights, in which the last named two faces of the intermediate uprights each has formed therein shelf clip supporting openings in the same number as and positioned in the same predetermined vertically spaced relation to the lower cross rail as the said last named openings in the end uprights, and in which the said adjustable means for supporting shelves comprises a plurality of clips, each having two flanges extending at right angles to each other, one of said flanges serving to underlie and furnish support to a shelf and the other having means thereon engageable in any of said clip suporting openings to support the clip on the upright in which the opening is contained.

22. A rack as described in claim 21 in which shelf supporting flanges of the clips each have extending upwardly thereon a sharp prong which will embed itself into a wood shelf to hold the shelf in place.

23. An adjustable rack comprising at least two spaced apart, generally rectangular, upright frames including end uprights, means for fastening said frames rigidly to each other in a generally parallel opposed relationship with the frames adjustably spaced from each other a plurality of predetermined distances, adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders, respectively, engage the opposed faces of said cross rails, means for removably securing said upright in the said vertically extending position at a plurality of positions spaced at predetermined distances from the said end uprights, and means adjustable on said uprights for supporting shelves on said rack at any of a plurality of predetermined levels, each of said lower cross rails having thereon an inwardly extending, horizontal, shelf supporting flange.

24. A cross rail for an adjustable rack having means at each end thereof for securing the rail to an end upright including at each end of a tang adapted to engage in a slot in the end upright and an extension adapted to be rigidly secured to the upright when the tang is engaged and supported in the slot.

25. A cross rail as described in claim 24 in which the said cross rail has a horizontal surface extending lengthwise thereof and having formed therein, at a plurality of positions spaced at predetermined distances from the ends of the rail, slots adapted to receive tangs on the ends of intermediate uprights in engagement with the said horizontal surface.

26. A cross rail as described in claim 25 on which there is a horizontal, shelf supporting flange extending on the rail inwardly of the surface in which the slots are formed and offset vertically from said surface in a direction away from that in which said surface faces.

27. A cross rail for an adjustable rack having means at each end thereof for securing the rail to an end upright and also having two spaced horizontal surfaces extending lengthwise of the rail, one facing upwardly and the other downwardly, and each having formed therein at a plurality of positions spaced on each surface at the same predetermined distances from the ends of the rail, slots adapted to receive tangs on the ends of intermediate uprights in engagement with the said horizontal surface, the slots on one of said surfaces having open ends which receive the tangs therethrough.

28. A cross rail as described in claim 27 in which there are pairs of said slots in each of the horizontal surfaces of said cross rail at each of said predetermined distances from the ends of the rail, the slots in each pair being so spaced from each other as to permit them to receive one each of a pair of tangs on the end of an intermediate upright in engagement with said horizontal surface and in which there is a horizontal shelf supporting flange extending on the rail inwardly of the surfaces in which the slots are formed and offset vertically from each of said surfaces in a direction away from that in which the said surface faces.

29. In an adjustable rack comprising upper and lower cross rails, an intermediate upright, each of said cross rails having a surface engaged by said intermediate upright and each of said surfaces having a slot therein and said intermediate upright having a shoulder at each end engaging one of said surfaces and a tang at each end extending out from the shoulder at each end lengthwise of the upright, which tangs are received respectively in the said slot in the surface of the cross rail engaged by the associated shoulder.

30. In an adjustable rack as described in claim 29 an intermediate upright as described in that claim on which there are two vertically extending side surfaces, one of which faces toward one end of the rack and the other toward the other end thereof and on which the two side surfaces each has formed therein a plurality of shelf clip supporting openings positioned in the same predetermined vertically spaced relation to the lower end of the upright on each of said surfaces.

31. In an adjustable rack as described in claim 30 in which there is more than one slot in each of said cross rail surfaces, an intermediate upright as described in that claim, on which there are two of said tangs at each end thereof, both of which are received in the said slots in the surface of the cross rail engaged by the associated shoulder.

32. An adjustable rack as described in claim 30, an intermediate upright as described in that claim in which the clip supporting openings are generally rectangular in configuration and are positioned so that two edges of each opening extend generally horizontally when the upright is in position on the rack.

33. An end upright for an adjustable rack having a longitudinally and inwardly extending flange having two openings therein, one adjacent each end thereof to receive fasteners for attaching upper and lower horizontal braces of variable length secured at their other ends to an opposing like upright at the same end of the rack, and also having two sets of at least three vertically spaced apart openings, each positioned between the first named openings to receive fasteners for attaching the upper end of one oblique brace of fixed length and the lower end of another like oblique brace, each of which is secured at its other end to said opposing like upright, each set having the same number of openings therein and having the other openings in the flange spaced from the upper opening in the uppermost set and the lower opening in the lowermost set, respectively, the same predetermined distances, one opening in each set being spaced from one of the openings adjacent thereto in the set a distance which is different from its spacing from the other opening adjacent thereto in the set and being closer in the uppermost set to the uppermost opening therein and in the lowermost set to the lowermost opening therein and the said openings in each set being positioned and spaced to provide a rack adjustable to any of at least three predetermined depths.

34. An upright as described in claim 33 which has a vertically extending surface facing in the rack toward the end thereof opposite to that of which the upright forms a part, said last named vertically extending surface having therein a plurality of generally rectangular shelf clip supporting openings positioned in a predetermined vertically spaced relation to the lower end of the upright with two edges of each opening extending generaly horizontally.

35. An upright as described in claim 34 in which there are two narrow vertically extending openings in the said surface having the clip supporting openings therein, one adjacent each end, to receive tangs on upper and lower cross rails in the rack to support the rails on the upright.

36. An adjustable storage rack comprising at least two spaced apart, generally rectangular, upright frames including end uprights and means for fastening said frames rigidly to each other in a generally parallel opposed relationship with the frames adjustably spaced from each other a plurality of predetermined distances comprising horizontal and oblique braces at each end of the frames and means for removably connecting each of said braces at each end of said frames to each of the uprights at that end of each of said frames in each of a plurality of predetermined relationships, the length of each of said oblique braces throughout its full extent from one frame to the other being fixed and predetermined.

37. A rack as described in claim 36 in which there are two of said horizontal braces and two of said oblique braces at each end of the frames, in which, at each end of the frames, the upper end of one of the oblique braces is connected to one of the uprights at that end and the upper end of the other oblique brace is connected to the other upright at that end and in which the horizontal braces are located, respectively, adjacent to the tops and bottoms of the frames and the oblique braces are positioned in overlapping relation on approximately the mid-portion of the uprights in a vertical direction.

38. A rack as described in claim 37 in which the means for connecting the oblique braces in a plurality of relationships comprises at least two vertically spaced fastener openings in each upright for each of the two oblique braces connected thereto and in which the horizontal braces are comprised of two separable overlapping parts and are provided with means for removably connecting said parts to each other in a plurality of relationships.

39. An adjustable rack comprising at least two spaced apart, generally rectangular, upright frames, including end uprights, means for fastening said frames rigidly to each other in a generally parallel opposed relationship and adjustable means positioned between the end uprights on at least one of said frames for transmitting the load of the top cross rail and of intermediate shelves to the bottom cross rail of said frame comprising an intermediate upright extending vertically between the said cross rails and having a shoulder at each end, which shoulders are spaced apart a fixed predetermined distance and, respectively, engage the opposed faces of said cross rails; and means for removably securing said upright in the said vertically extending position at a plurality of positions spaced at predetermined distances from the said end uprights.

References Cited by the Examiner

UNITED STATES PATENTS

| | | | |
|---|---|---|---|
| 1,044,889 | 11/1912 | Hyde | 108—106 |
| 1,648,830 | 11/1927 | Small | 211—182 |
| 2,132,832 | 10/1938 | Prive | 50—305 |
| 2,138,291 | 11/1938 | Callaghan | 189—34 |
| 2,194,987 | 3/1940 | Schaeffer | 211—182 |
| 2,218,427 | 10/1940 | Hurlbert | 287—54 |
| 2,365,252 | 12/1944 | Daum | 248—235 |
| 2,570,731 | 10/1951 | Susnow | 248—250 X |
| 2,708,088 | 5/1955 | Steinke | 248—223 |
| 2,784,812 | 3/1957 | Kindorf | 189—36 |
| 2,918,176 | 12/1959 | Bell | 211—176 |
| 2,935,210 | 5/1960 | Cohen | 211—176 |
| 3,009,719 | 11/1961 | Otto | 287—54 |
| 3,034,609 | 5/1962 | Young | 189—34 |
| 3,102,641 | 9/1963 | Konstant et al. | 211—148 |

FOREIGN PATENTS

| | | |
|---|---|---|
| 402,488 | 12/1933 | Great Britain. |
| 729,165 | 5/1955 | Great Britain. |

CLAUDE A. LE ROY, *Primary Examiner.*